3,641,223
S-(2-CHLORO-2-BROMO-ETHYL-(DI)THIO-PHOS-
PHORIC AND PHOSPHONIC ACID ESTERS
Hanshelmut Schlor, Wuppertal-Barmen, Ingeborg Hammann, Cologne, and Bernhard Homeyer, Opladen, Germany, assignors to Farbenfabriken Bayer Aktiengesellschaft, Leverkusen, Germany
No Drawing. Filed Aug. 28, 1968, Ser. No. 755,800
Claims priority, application Germany, Sept. 1, 1967,
P 16 68 012.9
Int. Cl. C07f 9/08, 9/40; A01n 9/36
U.S. Cl. 260—961                         5 Claims

ABSTRACT OF THE DISCLOSURE (Alkyl and O-alkyl)-O-alkyl-S-(2-chloro-2-bromo-ethyl)-thiol- and -thionothiol-phosphoric and phosphonic acid esters which possess insecticidal, acaricidal and nematicidal properties.

---

The present invention relates to and has for its objects the provision for particular new methods of producing (alkyl and O-alkyl)-O-alkyl-S-(2-chloro-2-bromo-ethyl)-thiol- and -thionothiol-phosphoric and phosphonic acid esters, i.e. S-(2-chloro-2-bromo-ethyl)-thiophosphorus acid esters, which are new compounds and which possess insecticidal, acaricidal and nematicidal properties, e.g. in a simple single step reaction, using readily available starting materials whereby to attain outstanding yields, with other and further objects of the invention becoming apparent from a study of the within specification and accompanying examples.

In U.S. Pat. 1,949,629 there is described the reaction of 1,2-dichloroethane with the ammonium salt of O,O-diisopropyl-thionothiol-phosphoric acid, in which O,O-diisopropyl-S-(2-chloro-ethyl)-thionothiol-phosphoric acid ester is said to be formed in the first reaction step. However, the isolation or purification of this hypothetical intermediate product is not disclosed.

In U.S. Pat. 2,266,514, the same compound is said to be obtained by reaction of equimolar amounts of the aforesaid starting materials, but information in regard to purity and yields of the product is lacking. Finally, from German Pat. 1,005,058, it is known that symmetrical 1,2-dihalo-ethanes, for example 1,2-dichloroethane or 1,2-dibromoethane, in general react with O,O-dialkyl-thiol- or -thionothiol-phosphoric acid salts, with exchange of both halogen atoms for the thiolphosphoric acid radical. According to the particulars given in that German patent, in the case of the reaction with O,O-dialkyl-thionothiol-phosphoric acid salts, a selective substitution of the halogen atoms succeeds only when the work is carried out in aqueous solution, while the reaction with the salts of the appropriate thiol-phosphoric acids leads to the desired result only when methyl-ethyl ketone is used as solvent.

It has now been found, in accordance with the present invention, that the new thiol- and thionothiol-S-(2-chloro-2-bromo-ethyl)-phosphoric and -phosphonic acid esters, which are new compounds and which possess insecticidal, acaricidal and nematicidal properties, having the formula

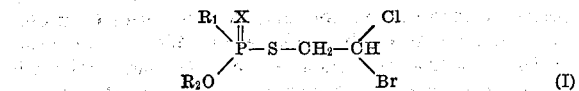

in which
$R_1$ is selected from the group consisting of lower alkyl and lower alkoxy,
$R_2$ is lower alkyl, and
X is selected from the group consisting of oxygen and sulfur, can be obtained smoothly and simply, that is in a one-step reaction and without the occurrence of undesirable side reactions, in high purity and with outstanding, practically quantitative, yields, by the process which comprises reacting thiol- and thionothiol-phosphoric and phosphonic acid salts, i.e. thiophosphorus acid salts, having the general formula

in which $R_1$, $R_2$ and X are the same as defined above, and M is a monovalent metal equivalent, e.g. alkali metal ion, or ammonium, with 1-chloro-1,2-dibromo-ethane (IIb) in the presence of an inert organic solvent or diluent, for example at a temperature substantially between about 30–100° C.

The smooth and uniform course of the process of the present invention could not in any way have been foreseen. For example, it was surprising that, in such process, only one halogen atom of the ethane moiety should be substituted or exchanged; moreover, even if a single substitution could have been foreseen, it would have been expected that the bromine atom in 1-position, activated by the adjacent chlorine atom, would be exchanged, rather than the substantially less reactive 2-bromine atom. With the aid of the nuclear resonance spectrum, however, it has been possible to prove clearly that in fact the instant new compounds of Formula I above are formed and not, for example, the corresponding isomeric products of the formula

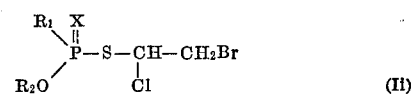

The course of the process reaction of the present invention can be represented by the following typical reaction equation:

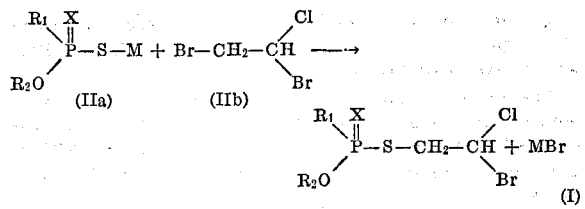

In the formulae of this equation, the symbols $R_1$, $R_2$, X and M are the same as defined above.

Advantageously, in accordance with the present invention in the various formulae herein:
$R_1$ represents
 lower alkyl such as methyl, ethyl, n- and iso-propyl, n-, iso-, sec.- and tert-butyl, and the like, especially methyl, ethyl, n- and iso-propyl, and n-, iso- and sec.-butyl, including alkyl having 1–4 carbon atoms, and particularly methyl and ethyl; or
 lower alkoxy such as methoxy, ethoxy, n- and iso-propoxy, n-, iso-, sec.- and tert.-butoxy, and the like, especially methoxy, ethoxy, n- and iso-propoxy, and n-, iso- and sec.-butoxy, including alkoxy having 1–4 carbon atoms, and particularly ethoxy;
$R_2$ represents
 lower alkyl such as methyl to tert.-butyl inclusive, and the like, as defined above; $R_1$ and $R_2$ being the same or different when $R_1$ is also lower alkyl;
X is oxygen or sulfur, preferably sulfur; and
M is a monovalent metal equivalent such as an alkali metal ion, e.g. potassium, sodium, lithium, etc., or an ammonium group (i.e. $NH_4$).

In accordance with a preferred embodiment of the in-invention, (alkyl and O - alkyl) - O-alkyl-S-(2-chloro-2-bromoethyl)-thionothiol phosphoric and phosphonic acid esters having the formula

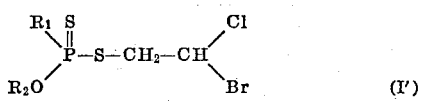

in which $R_1$ and $R_2$ are the same as defined above, are produced by reacting the appropriate thionothiol-phosphoric and -phosphonic acid salts with said 1-chloro-1,2-dibromoethane.

The 1-chloro-1,2-dibromoethane required as starting material is readily obtainable, even on an industrial scale, by addition of bromine to vinyl chloride according to the following starting material production equation:

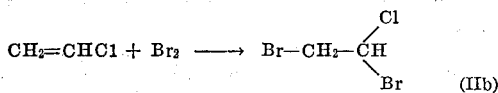

The distillable product (IIb) boils at 50 to 52° C. under a pressure of 14 mm. Hg.

As solvents (which term includes a mere diluent) which are to be used in accordance with the process of the present invention, all inert organic solvents (and diluents) and mixtures thereof are suitable. Preferred solvents include hydrocarbons, especially aliphatic and aromatic hydrocarbons and mixtures thereof, such as petroleum ether fractions (e.g. benzine), benzene, toluenes and/or xylenes; chlorinated hydrocarbons, especially chlorinated aliphatic and chlorinated aromatic hydrocarbons and mixtures thereof, such as carbon tetrachloride, 1,1,2,2-tetrachloroethane, chlorobenzene, o-dichlorobenzene and/or α-chloronaphthalene; ethers, especially aliphatic and cycloaliphatic ethers and mixtures thereof, such as diethyl ether, dibutyl ether, dioxan and/or tetrahydrofuran; ketones, especially aliphatic ketones and mixtures thereof, such as acetone, methylethyl ketones, methylisobutyl ketone and/or methylisopropyl ketone; alcohols, especially aliphatic alcohols and mixtures thereof, such as methanol, ethanol, n-propanol and/or isopropanol; and/or low-boiling aliphatic nitriles and mixtures thereof, such as acetonitrile and/or propionitrile, which give particularly good results.

The reaction may be carried out within a fairly wide temperature range. In general, it is carried out at substantially between about 30 to 100° C. or at the boiling point of the mixture, preferably at between about 40 to 80° C.

According to the above-noted reaction equation, 1 mol of 1-chloro-1,2-dibromo- ethane is required per mol of starting thiol- or thionothiol-phosphoric (phosphonic) acid salt. In order to improve the yield and to obtain a purer product, it has, however, proved advantageous to use the 1-chloro-1,2-dibromo-ethane in a considerable excess (about 100%, that is, approximately 2 mols of 1-chloro-1,2-dibromo-ethane per mol of starting thiol- or thionothiol-phosphoric (phosphonic) acid salt).

Expediently, a mixture of excess 1-chloro-1,2-dibromo-ethane and one of the above-mentioned solvents, preferably acetonitrile, is provided, and to this mixture there is added dropwise a solution or suspension of the starting thiophosphoric (phosphonic) acid salt concerned in the same solvent. After completion of the addition, the reaction mixture is stirred for a further 1 to 4 hours, with heating, so as to complete the reaction, and the mixture is then cooled to room temperature.

Working up of the mixture may take place in the usual manner by pouring the mixture into water, taking up the reaction product (which has separated in oily form) in one of the above-mentioned hydrocarbons, preferably carbon tetrachloride, washing and drying the organic phase, evaporating the solvent, and, optionally, subsequently fractionally distilling the residue.

The instant products of the process of the present invention are obtained in most cases in the form of colorless to slightly yellow-colored, water-insoluble oils which can be distilled under greatly reduced pressure without decomposition.

Advantageously, as already mentioned above, the thiol- or thionothiol-phosphoric or phosphonic acid esters of the present invention are distinguished by outstanding insecticidal, acaricidal and nematicidal properties with, in some cases, extremely low toxicity to warm-blooded animals and concomitantly low phytotoxicity. The pesticidal effect sets in rapidly and is long-lasting. The instant products are, therefore, used with favorable success in plant protection and the protection of stored products, as well as in the hygiene field, for the control of noxious sucking and biting insects, Diptera and mites (Acari), as well as nematodes, in particular those of phytopathogenic nature.

To the sucking insects contemplated herein, there belong, in the main, aphids (Aphidae) such as the green peach aphid (*Myzus persicae*), the bean apid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum alphid (*Hyalopterus arundinis*) and the cherry black-fly (*Myzus cerasi*); in addition, scales the mealybugs (Coccina), for example the oleander scale (*Aspidiotus hederae*) and the soft scale (*Lecanium hesperidum*) as well as the grape mealybug (*Pseudo-coccus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*), and, further, cicadas, such as *Euscelis bilobatus* and *Nephotettix bipunctacus*, and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall army-worm (*Laphygma frugiperda*) and the cotton worm (*Prodenia litura*); further, the ermine moth (*Hyponomeuta padella*), the Mediterranean flour moth (*Ephestia kuhniella*) and greater wax moth (*Galleria mellonella*); and the like.

Also to be classed with the biting insects contemplated herein are beetles (Coleoptera), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeuneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafter (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental coockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domestica*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aeginx*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (*Tetranychidae*) such as the two-spotted spider mite (*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

To the phytopathogenic nematodes contemplated herein there belong in the main, leaf nematodes (Aphelenchoides), such as *chrysanthemum foliar* nematodes (*A. ritzemabosi*), strawberry nematodes (*A. fragariae*) and rice nematodes (*A. Oryzae*); stem nematodes (Ditylenchus), for example the stem nematode (*D. dipsaci*); root gall nematodes (Meloidogyne), such as *M. arenaria* and *M. incognita*; cyst-forming nematodes (*Heterodera*), such as golden nematode of potato (*H. rostochiensis*), and sugar beet nematode (*H. schachtii*); and free-living root nematodes, for example of the general Pratylenchus, Paratylenchus, Rotylenchus, Xiphinema and Radopholus; and the like.

When used against hygiene pests and pests of stored products, particularly flies and gnats, the instant new compounds are distinguished also by an outstanding residual effect on wood and clay as well as a good stability to alkali on limed substrates.

The particular active compounds produced according to the instant invention can be utilized, if desired, in the form of the usual formulations or compositions with conventional pesticidal diluents or extenders, i.e. conventional pesticidal dispersible carrier vehicles, such as solutions, emulsions, suspenion, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agetns, whereby, for example, in the case where water is used as diluent, organic solvents may be added as auxiliary solvents. The following may be chiefly considered for use as conventional carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other acaricides, insecticides, nematicides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active amount of a carrier vehicle assistant, e.g. surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of active compound or even the 100% active substance alone, e.g. about 40–100% by weight of the active compound.

Furthermore, the present invention contemplates methods of selectively controlling or combating insects, acarids and/or nematodes, which comprise applying to at least one of (a) such insects, acarids and/or nematodes, i.e. such pests, and (b) their habitat, i.e. the locus to be protected, a combative or toxic amount, i.e. an insecticidally acaricidally and/or nematicidally effective amount, of the particular active compound of the invention alone or together with a carrier vehicle as noted above. The instant formulations or compositions are applied in the usual manner, for instance by spraying, atomizing, vaporizing, fumigating, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The insecticidal, acaricidal and nematicidal activity of the instant active compounds is illustrated, without limitation, by the following examples.

EXAMPLE 1

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

1 ml. of the given active compound preparation is applied with a pipette to a filter paper disc of 7 cm. diameter. The wet disc is placed in a glass vessel containing 50 vinegar flies (*Drosophila melanogaster*) and covered with a glass plate.

After the specified period of time, the destruction is determined as a percentage: 100% means that all the flies are killed; 0% means that none of the flies are killed.

The particular active compounds tested, their concentrations, the evaluation time and the degree of destruction obtained can be seen from Table 1.

TABLE 1

| Active compound (constitution) | Concentration of active compound in percent | Degree of destruction in percent after 24 hours |
| --- | --- | --- |
| (A) $(CH_3O)_2\overset{O}{\overset{\|}{P}}-S-CH_2-CH_2-S\,C_2H_5$ (known) | 0.1<br>0.01 | 100<br>0 |
| ($1_1$) $C_2H_5O-\overset{S}{\overset{\|}{P}}(C_2H_5O)-S-CH_2-\overset{Cl}{\overset{\|}{C}H}(Br)$ | 0.1<br>0.01<br>0.001 | 100<br>100<br>100 |
| ($2_1$) $CH_3-\overset{S}{\overset{\|}{P}}(C_2H_5O)-S-CH_2-\overset{Cl}{\overset{\|}{C}H}(Br)$ | 0.1<br>0.01<br>0.001<br>0.0001 | 100<br>100<br>100<br>95 |
| ($3_1$) $C_2H_5-\overset{S}{\overset{\|}{P}}(C_2H_5O)-S-CH_2-\overset{Cl}{\overset{\|}{C}H}(Br)$ | 0.1<br>0.01<br>0.001 | 100<br>100<br>100 |

EXAMPLE 2

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and are then infested with caterpillars of the diamondback moth (*Plutella maculipennis*).

After the specified period of time, the degree of destruction is determined as a percentage: 100% means that all the caterpillars are killed whereas 0% means that none of the caterpillars are killed.

The particular active compound tested, the concentrations thereof, the evaluation time and the results obtained can be seen from Table 2.

TABLE 2

| Active compound (constitution) | Concentration of active compound in percent | Degree of destruction in percent after 3 days |
| --- | --- | --- |
| ($3_2$) $C_2H_5-\overset{S}{\overset{\|}{P}}(C_2H_5O)-S-CH_2-\overset{Cl}{\overset{\|}{C}H}(Br)$ | 0.1<br>0.01 | 100<br>100 |

EXAMPLE 3

Laphygma test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and are then infested with caterpillars of the owlet moth (*Laphygma exigua*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from Table 3.

TABLE 3

| Active compound (constitution) | Concentration of active compound in percent | Degree of destruction in percent after 3 days |
| --- | --- | --- |
| (A) $(CH_3O)_2\overset{O}{\overset{\|}{P}}-S-CH_2-CH_2-S\,C_2H_5$ (known) | 0.1<br>0.01 | 100<br>0 |
| ($3_3$) $C_2H_5-\overset{S}{\overset{\|}{P}}(C_2H_5O)-S-CH_2-\overset{Cl}{\overset{\|}{C}H}(Br)$ | 0.1<br>0.01 | 100<br>100 |

EXAMPLE 4

Critical concentration test

Test nematode: *Meloidogyne incognita*
Solvent: 40 parts by weight dimethyl formamide
Emulsifier: 10 parts by weight alkylaryl polyglycol ether To produce a suitable preparation of the particular active compound, 1 part by weight of such active compound is mixed with the stated amount of solvent, the stated amount of emulsifier is added and the resulting concentrate is diluted with water to the desired final concentration.

The given active compound preparation is intimately mixed with soil which is heavily infested with the test nematodes. The concentration of the active compound in the preparation is of practically no importance; only the amount of active compound per unit volume of soil, which is given p.p.m. (parts per million), is decisive. The soil is filled into pots, lettuce is sown in and the pots are kept at a green house temperature of 27° C. After 4 weeks, the lettuce roots are examined for infestation with nematodes, and the degree of effectiveness of the given active compound is determined as a percentage. The degree of effectiveness is 100% when infestation is completely avoided; it is 0% when the infestation is exactly the same as in the case of the control plants in untreated soil which has been infested in the same manner.

The active compound tested, the amounts applied and the results obtained can be seen from the following Table 4:

TABLE 4

| Active compound (constitution) | Degree of effectiveness in percent with amounts applied of— | | | |
|---|---|---|---|---|
| | 50 p.p.m. | 40 p.p.m. | 20 p.p.m. | 10 p.p.m. |
| (3₄) 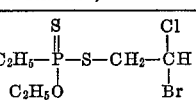 | 100 | 100 | 100 | 100 |

The following further examples illustrate, without limitation, the process for producing the instant compounds in accordance with the present invention:

EXAMPLE 5

(2₂) 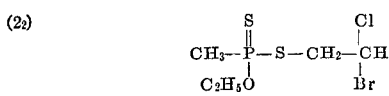

134 g. (0.6 mol=100% excess) of 1-chloro-1,2-dibromo-ethane (B.P. 50 to 52° C./14 mm. Hg) are provided in 200 ml. of acetonitrile. To this mixture are rapidly added dropwise, at 50° C., 58 g. (0.3 mol) of potassium methyl-O-ethyl-thionothiol-phosphonate which had previously been dissolved, with heating, in 250 ml. of acetonitrile; the mixture is subsequently heated to the boil for 3 hours. The reaction mixture is then cooled; the salt-like precipitate is filtered off with suction and washed out with methanol, and the filtrate is concentrated to half its volume. The residue is taken up in carbon tetrachloride, the solution is washed with water and then dried over sodium sulfate. After the solvent has been drawn off, first the excess 1-chloro-1,2-dibromoethane is distilled off and then the residue is subjected to fractional distillation. The methyl-O-ethyl - S - (2-chloro-2-bromo-ethyl)-thionothiolphosphonic acid ester boils at 138° C. to 142° C. under a pressure of 4 mm. Hg and possesses the refractive index $n_D^{25}$=1.5677. The yield is 47 g. (53% of the theory).

Analysis.—$C_5H_{11}BrClOPS_2$ (molecular weight 297.5). Calculated (percent): P, 10.42; S, 21.52; Cl, 11.94. Found (percent): P, 10.85; S, 21.74; Cl, 11.84.

EXAMPLE 6

(3₅) 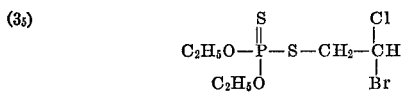

To 89 g. (0.4 mol) 1-chloro-1,2-dibromoethane in 150 ml. of acetonitrile there are added dropwise, at 50° C., 42 g. (0.2 mol) of potassium ethyl-O-ethyl-thionothiolphosphonate dissolved in 150 ml. of acetonitrile. The mixture is then heated to the boil for 3 hours, worked up as stated in Example 5, and 36 g. (58% of the theory) of ethyl - O - ethyl - S-(2-chloro-2-bromo-ethyl)-thionothiolphosphonic acid ester with the boiling point 140 to 142° C./3 mm. Hg are obtained.

EXAMPLE 7

(1₂) 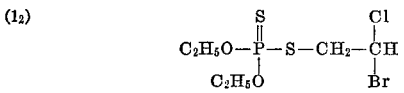

A solution of 134 g. (0.6 mol) of 1-chloro-1,2-dibromoethane in 225 ml. of acetonitrile is reacted as described in Example 5 with 61 g. (0.3 mol) of ammonium O,O-diethyl-thionothiol-phosphate dissolved in 225 ml. of acetonitrile. The working up (effected in the manner stated above) of the reaction mixture yields 50 g. (76% of the theory) of O,O-diethyl-S-(2-chloro-2-bromo-ethyl)-thionothiol-phosphoric acid ester in the form of an oil which boils at 120 to 122° C. under a pressure of 2 mm. Hg When the corresponding thiol phosphonate and phosphate salts of the starting thionothiol compounds of Examples 5, 6 and 7, respectively, are reacted with 1-chloro-1,2-dibromo-ethane, the appropriate corresponding thiol phosphonic and phosphoric acid-S-(2-chloro-2-bromo-ethyl)-esters are produced It will be realized by the artisan that all of the foregoing compounds contemplated by the present invention, i.e. produced by the instant process, possess the desired strong and selective insecticidal, acaricidal and nematicidal properties for combating insects, acarids and nematodes, as well as a comparatively low toxicity toward warm-blooded creatures and a concomitantly low phytotoxicity, enabling such compounds to be used with correspondingly favorable compatibility with warm-blooded creatures and plants for more effective control and/or elimination of insects, acarids and nematodes by application of such compounds of such insects, acarids, nematodes and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Thio-phosphorus acid ester of the formula

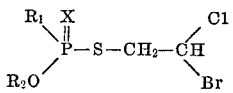

in which $R_1$ is selected from the group consisting of lower alkyl and lower alkoxy, $R_2$ is lower alkyl, and X is selected from the group consisting of oxygen and sulfur.

2. Ester according to claim 1 wherein $R_1$ is selected from the group consisting of alkyl of 1–4 carbon atoms and alkoxy of 1–4 carbon atoms, $R_2$ is alkyl of 1–4 carbon atoms and X is sulfur.

3. Ester according to claim 1 wherein such compound is O,O - diethyl - S-(2-chloro-2-bromo-ethyl)-thionothiolphosphoric acid ester of the formula

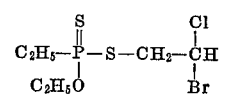

4. Ester according to claim 1 wherein such compound is methyl - O - ethyl - S-(2-chloro-2-bromo-ethyl)-thionothiol-phosphonic acid ester of the formula

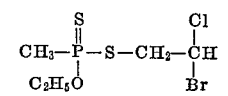

5. Ester according to claim 1 wherein such compound is ethyl - O - ethyl - S - (2 - chloro-2-bromo-ethyl)-thionothiol-phosphonic acid ester of the formula

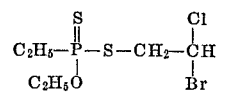

References Cited

UNITED STATES PATENTS 2,931,824   4/1960   Schrader _____ 260—979 X
3,020,304   2/1962   Scherer et al. _____ 260—979 X

FOREIGN PATENTS 806,238   12/1958   Great Britain _____ 260—963 X

CHARLES B. PARKER, Primary Examiner
A. H. SUTTO, Assistant Examiner

U.S. Cl. X.R.
260—963, 979; 424—222, 224